(12) United States Patent
Rajamanickam et al.

(10) Patent No.: US 12,316,536 B2
(45) Date of Patent: **\*May 27, 2025**

(54) MULTIPROTOCOL LABEL SWITCHING (MPLS) DATA PLANE HEADER EXTENSIONS

(71) Applicant: Cisco Technology, Inc., San Jose, CA (US)

(72) Inventors: Jaganbabu Rajamanickam, Kanata (CA); Rakesh Gandhi, Stittsville (CA); Jisu Bhattacharya, San Jose, CA (US)

(73) Assignee: Cisco Technology, Inc., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/611,925

(22) Filed: Mar. 21, 2024

(65) Prior Publication Data
US 2024/0235993 A1 Jul. 11, 2024

Related U.S. Application Data

(63) Continuation of application No. 17/699,638, filed on Mar. 21, 2022, now Pat. No. 11,979,317.
(Continued)

(51) Int. Cl.
*H04L 45/50* (2022.01)
*H04L 45/12* (2022.01)
*H04L 45/42* (2022.01)

(52) U.S. Cl.
CPC .......... *H04L 45/507* (2013.01); *H04L 45/123* (2013.01); *H04L 45/42* (2013.01)

(58) Field of Classification Search
CPC ...... H04L 45/507; H04L 45/123; H04L 45/42
(Continued)

(56) References Cited

U.S. PATENT DOCUMENTS

| 2006/0182127 A1* | 8/2006 | Park | H04L 45/302 370/400 |
| 2015/0200843 A1* | 7/2015 | Frost | H04L 45/24 370/235 |

(Continued)

FOREIGN PATENT DOCUMENTS

CN 108111416 6/2018

OTHER PUBLICATIONS

Bryant F., "A Primer on the Development of MPLS draft-bryant-mpls-dev-primer-00", draft-bryant-mpls-dev-primer-00.txt, Internet-draft, MPLS, Internet Engineering Task Force, IETF, Standard working draft, Internet SO, Mar. 31, 2021, pp. 1-13, XP015145193, p. 5-p. 9.

(Continued)

*Primary Examiner* — Hermon Asres
(74) *Attorney, Agent, or Firm* — Polsinelli P.C.

(57) ABSTRACT

Systems and techniques are provided for implementing multiprotocol label switching (MPLS) header extensions. In some examples, a method can include, receiving, by a router of a MPLS network, a data packet. In some aspects, the method can include adding, by the router of the MPLS network, at least one entry to an MPLS stack of the data packet, wherein the at least one entry includes an MPLS extension indicator (MEI) that is associated with at least one of an in-stack extension header presence indicator (IPI) and a bottom-of-stack extension header presence indicator (BPI). In some examples, the method can include adding, based on the IPI and the BPI, at least one of an in-stack extension header and a bottom-of-stack extension header to the MPLS stack of the data packet.

20 Claims, 10 Drawing Sheets

Related U.S. Application Data

(60) Provisional application No. 63/242,642, filed on Sep. 10, 2021, provisional application No. 63/278,913, filed on Nov. 12, 2021, provisional application No. 63/301,223, filed on Jan. 20, 2022.

(58) Field of Classification Search
USPC .......................................................... 709/238
See application file for complete search history.

(56) References Cited

U.S. PATENT DOCUMENTS

| | | |
|---|---|---|
| 2017/0195205 A1* | 7/2017 | Li ............................ H04L 43/50 |
| 2020/0287824 A1 | 9/2020 | Dutta |
| 2020/0358698 A1* | 11/2020 | Song ........................ H04L 45/50 |
| 2021/0135986 A1 | 5/2021 | Song et al. |
| 2022/0174009 A1* | 6/2022 | Qiu ......................... H04L 45/74 |

OTHER PUBLICATIONS

International Search Report and Written Opinion for International Application No. PCT/US2022/075983, mailed Dec. 14, 2022, 15 Pages.

* cited by examiner

| | | | | |
|---|---|---|---|---|
| 702 | ENTROPY LABEL INDICATOR | | | |
| 704 | ENTROPY LABEL | TC | S = 0 | TTL |
| 706 | IS-FI OPCODE = 1 | FI FLAGS | | |
| | | IL = 4 | | ELC (BPI = 1; HBI = 1) |
| 708 | 1 | FI FLAGS | | |
| | | R D = 0 | E S = 0 | FI FLAGS |
| 710 | IS-FI OPCODE = 2 | RESERVED = 0 | | |
| | | R D = 1 | E S = 0 | FI FLAGS |
| 712 | IS-FI OPCODE = 3 | DATA | | |
| | | R D = 1 | E S = 0 | OFFSET = 1 |
| 714 | 0 0 0 0 | VERSION | R D = 1 | E S = 1 | DATA |
| | CONTROL CHANNEL | | | |
| 716 | 0 0 1 0 | VERSION | BOS-FI OPCODE = 1 | LENGTH = 1 | FLAGS (HBH = 1) |
| 718 | BOTTOM OF STACK DATA | | | |
| 720 | 0 0 1 0 | VERSION | BOS-FI OPCODE = 2 | LENGTH = 2 | FLAGS (HBH = 0) |
| 722 | BOTTOM OF STACK DATA | | | |
| 724 | BOTTOM OF STACK DATA | | | |
| 726 | PAYLOAD | | | |

FIG. 7

MULTIPROTOCOL LABEL SWITCHING (MPLS) DATA PLANE HEADER EXTENSIONS

CROSS-REFERENCE TO RELATED APPLICATIONS

This application is a continuation of U.S. Non-Provisional Application Ser. No. 17/699,638, filed Mar. 21, 2022, for "Multiprotocol Label Switching (MPLS) Data Plane Header Extensions" which claims the benefit of U.S. Provisional Application No. 63/242,642, filed Sep. 10, 2021, for "Multiprotocol Label Switching Data Plane Header Extensions," U.S. Provisional Application No. 63/278,913, filed Nov. 12, 2021, for "Multiprotocol Label Switching Data Plane Header Extensions," and U.S. Provisional Application No. 63/301,223, filed Jan. 20, 2022, for "Multiprotocol Label Switching Data Plane Header Extensions," each of which are incorporated herein by reference.

TECHNICAL FIELD

The subject matter of this disclosure relates in general to the field of computer networking, and more particularly, to systems and methods for implementing Multiprotocol Label Switching (MPLS) header extensions.

BACKGROUND

A computer network is a collection of interconnected computing devices that can exchange data and share resources. Example network devices can include layer two (L2) devices (e.g., switches) that can operate in the data link layer and layer three (L3) devices (e.g., routers) that can operate in the network layer. In some cases, Multiprotocol Label Switching (MPLS) can be used to build next-generation, intelligent networks that deliver a wide variety of advanced, valued-added services over a single infrastructure. MPLS can be integrated over any existing infrastructure, such as Internet Protocol (IP), Frame Relay, Ethernet (e.g., Ethernet Virtual Private Network (EVPN)), Asynchronous Transfer Mode (ATM), etc. Subscribers with differing access links can be aggregated on an MPLS edge without changing their current environments as MPLS is independent of access technologies.

In some examples, MPLS may enable faster routing decisions by preconfiguring "tags" that can be used to determine a path between routers. In some cases, the "tags" may correspond to labels that are carried in short packet header fields that may be extracted by switches or routers in the network. For example, a label may be associated with particular outgoing port(s) in order to route traffic based on the label and without further inspection of the packet header. In some configuration, labels can be stacked to implement MPLS tunnelling.

BRIEF DESCRIPTION OF THE DRAWINGS

In order to describe the manner in which the various advantages and features of the disclosure can be obtained, a more detailed description will be rendered by reference to specific embodiments which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 7 illustrates another example MPLS label stack that includes in-stack and bottom-of-stack MPLS extension headers, in accordance with some examples;

DESCRIPTION OF EXAMPLE EMBODIMENTS

Figure 1:
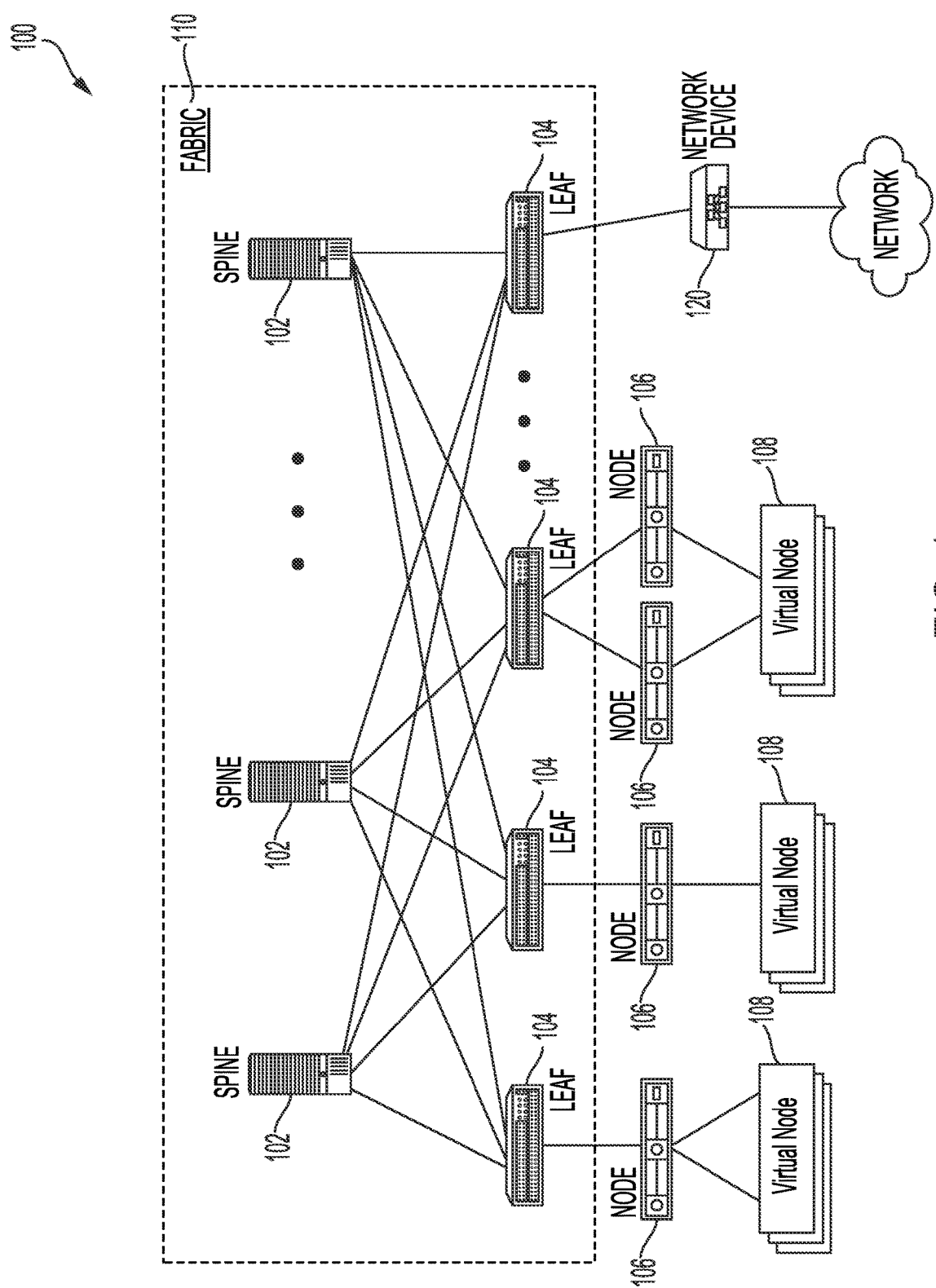
FIG. 1 is a block diagram illustrating an example network architecture, in accordance with some examples.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

OVERVIEW

Disclosed herein are systems, methods, and computer-readable media for implementing Multiprotocol Label Switching (MPLS) header extensions. According to at least one example, a method for implementing MPLS header extensions is provided. The method can include: receiving, by a router of a multiprotocol label switching (MPLS) network, a data packet; adding, by the router of the MPLS network, at least one entry to an MPLS stack of the data packet, wherein the at least one entry includes an MPLS extension indicator (MEI) that is associated with at least one of an in-stack extension header presence indicator (IPI) and a bottom-of-stack extension header presence indicator (BPI); and adding, based on the IPI and the BPI, at least one of an in-stack extension header and a bottom-of-stack extension header to the MPLS stack of the data packet.

According to at least one example, an apparatus is provided that includes one or more processors and at least one computer-readable storage medium having stored thereon instructions which, when executed by the one or more processors, cause the apparatus to: add at least one entry to a multiprotocol label switching (MPLS) stack of a data packet, wherein the at least one entry includes an MPLS extension indicator (MEI) that is associated with at least one of an in-stack extension header presence indicator (IPI) and a bottom-of-stack extension header presence indicator (BPI); and add, based on the IPI and the BPI, at least one of an in-stack extension header and a bottom-of-stack extension header to the MPLS stack of the data packet.

According to at least one example, a non-transitory computer-readable storage medium is provided. The non-transitory computer-readable storage medium can store instructions which, when executed by one or more processors, cause the one or more processors to: add at least one entry to a multiprotocol label switching (MPLS) stack of a data packet, wherein the at least one entry includes an MPLS extension indicator (MEI) that is associated with at least one of an in-stack extension header presence indicator (IPI) and a bottom-of-stack extension header presence indicator (BPI); and add, based on the IPI and the BPI, at least one of an in-stack extension header and a bottom-of-stack extension header to the MPLS stack of the data packet.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

EXAMPLE EMBODIMENTS

Multiprotocol Label Switching (MPLS) is a routing technique that routes and/or switches data packets based on labels instead of network addresses. The labels used for directing the data packet through the MPLS network are included in an MPLS header (e.g., MPLS label stack). In some cases, applications may require MPLS packets to include additional indicators and/or data that may be used in MPLS packet forwarding decision and/or for operations, administration, and maintenance (OAM) functions.

In some examples, applications require a separate extended special purpose label in order to implement the new routing and/or OAM functionality. However, each unique special purpose label results in at least two additional label stack entries—a first label stack entry for the extension label indicator and a second label stack entry for the extended special purpose label. In some cases, implementation of such labels may unduly burden the MPLS network. Moreover, such an approach is not easily scalable because it increases the label stack depth with multiple extended special purpose labels that need to be imposed by the encapsulation node and scanned by the intermediate nodes. Furthermore, current solutions do not provide for adding ancillary data within the stack or after the bottom-of-stack in an MPLS packet. Examples of ancillary data can include network slice identifier, In-Situ OAM data presence indicator, data flow identifier, in-band telemetry indicator, alternate-marking method for delay/loss measurement identifier, fragmentation identifier, already fast-rerouted packet identifier, timestamp presence indicator, network resource partition identifier, etc.

The present technology provides systems and techniques for implementing Multiprotocol Label Switching (MPLS) extension headers. In some aspects, a new MPLS data plane extension header format can be used to efficiently encode forwarding and/or OAM instructions. For example, instructions may be encoded as flags and/or opcodes that can be carrier without ancillary data. In some cases, instructions may be encoded as flags and/or opcodes that are associated with in-stack data. In some aspects, instructions may be encoded as flags and/or opcodes that are associated with bottom-of-stack data.

FIG. 1 is a block diagram illustrating an example network architecture 100, in accordance with some examples. In some aspects, the network architecture 100 can include a network fabric 110. The network fabric 110 can include and/or represent the physical layer or infrastructure (e.g., underlay) of the network architecture 100. For example, in some cases, the network fabric 110 can represent a data center(s) of one or more networks such as, for example, one or more cloud networks. In this example architecture, the fabric 110 can include spine nodes 102 (e.g., spine switches or routers) and leaf nodes 104 (e.g., leaf switches or routers), which can be interconnected to route or switch traffic in the fabric 110.

The spine nodes 102 can interconnect with the leaf nodes 104 in the fabric 110, and the leaf nodes 104 can connect the fabric 110 to an external network(s), a network overlay(s) and/or logical portion(s) of the network. In some cases, the network overlay(s) and/or logical portion(s) of the network can include, for example, application services, servers, virtual machines, software containers, virtual resources (e.g., storage, memory, CPU, network interfaces, applications, execution environments, etc.), virtual networks, etc.

Network connectivity in the fabric 110 can flow from the spine nodes 102 to the leaf nodes 104, and vice versa. In some cases, the interconnections between the leaf nodes 104 and the spine nodes 102 can be redundant (e.g., multiple interconnections) to avoid a failure in routing. In some examples, the leaf nodes 104 and the spine nodes 102 can be fully connected, such that any given leaf node is connected to each of the spine nodes 102, and any given spine node is connected to each of the leaf nodes 104. Other interconnections between the leaf nodes 104 and the spine nodes 102 are also possible and contemplated herein.

In some cases, the leaf nodes 104 can be, for example, top-of-rack ("ToR") switches, aggregation switches, gateways, ingress and/or egress switches, provider edge devices, and/or any other type of routing or switching device. The leaf nodes 104 can route and/or bridge client/tenant/customer packets to and from other elements, as further described below. In some cases, the leaf nodes 104 can apply network policies or rules to packets. The leaf nodes 104 can connect other elements to the fabric 110. For example, the leaf nodes 104 can connect the server nodes 106, virtual nodes 108 (e.g., virtual machines (VMs), software containers, etc.), network device 120, etc., with the fabric 110. In some examples, one or more of such elements can reside in one or more logical or virtual layers or networks, such as an overlay network. In some cases, the leaf nodes 104 can encapsulate and decapsulate packets to and from such elements in order to enable communications throughout network architecture 100 and/or the fabric 110. The leaf nodes 104 can also provide any other devices, services, tenants, or workloads access to the fabric 110.

In some cases, the server nodes 106 connected to the leaf nodes 104 can encapsulate and decapsulate packets to and from the leaf nodes 104. For example, the server nodes 106 can include one or more virtual switches, routers tunnel endpoints, etc., for tunneling packets between an overlay or logical layer hosted by, or connected to, the server nodes 106 and an underlay layer represented by or included in the fabric 110 and accessed via the leaf nodes 104. The server nodes 106 can include, for example, computing devices, such as physical servers, network devices (e.g., switches, routers, etc.), storage devices, and the like. Moreover, the server nodes 106 can host virtual nodes 108 as further described herein.

In some cases, some or all of the virtual nodes 108 can include software containers, virtual machines, software applications, services, appliances, functions, service chains, etc. For example, one or more of the virtual nodes 108 can include a software container providing an execution environment, a storage service, a firewall service, a message router, a virtual switch, and/or any other application service. One or more applications can be hosted or implemented by one or more software containers corresponding to one or more of the virtual nodes 108 or can be distributed, chained, etc. In some cases, some or all of the virtual nodes 108 can include virtual machines (VMs). VMs can include workloads running on a guest operating system on a respective node. In some cases, a VM (e.g., 108) on a server node (e.g., 106) can be migrated to a different server node (e.g., 106).

In some cases, one or more server nodes 106 and/or virtual nodes 108 can represent or reside in one or more tenant or customer spaces. A tenant or customer space can include workloads, services, applications, devices, networks, networks or routing domains (e.g., virtual routing and forwarding (VRF) domains, bridge domains (BDs), subnets, virtual networks, etc.) and/or resources associated with one or more clients or subscribers. In some examples, traffic in the network architecture 100 can be routed based on specific tenant policies, agreements, configurations, etc. In some cases, addressing can vary between tenants. In some examples, tenant spaces can be divided into logical segments and/or networks and separated from logical segments and/or networks associated with other tenants.

Configurations in the network architecture 100 can be implemented at a logical level, a hardware level (e.g., physical), and/or both. For example, configurations can be implemented at a logical and/or hardware level based on connection attributes, endpoint or resource attributes, etc., such as endpoint types and/or application groups or profiles. In some examples, configurations can be implemented through a software-defined network (SDN), underlay framework and/or overlay framework. Such configurations can define rules, policies, priorities, protocols, attributes, objects, profiles, groups, traffic, security parameters, etc., for routing, processing, and/or classifying traffic in the network architecture 100. For example, configurations can define attributes and objects for classifying and processing traffic based on endpoint groups (EPGs), security groups (SGs), VM types, BDs, VRFs, tenants, priorities, firewall rules, labels, addresses, etc.

The network architecture 100 can deploy different resources (e.g., hosts, applications, services, functions, etc.) via the leaf nodes 104, the server nodes 106, the virtual nodes 108, and/or any other device. The network architecture 100 can interoperate with a variety of server nodes 106 (e.g., physical and/or virtual servers), orchestration platforms, systems, etc. In some cases, the network architecture 100 can implement and/or can be part of one or more cloud networks and can provide cloud computing services such as, for example, cloud storage, software-as-a-service (SaaS) (e.g., collaboration services, email services, enterprise resource planning services, content services, communication services, etc.), infrastructure-as-a-service (IaaS) (e.g., security services, networking services, systems management services, etc.), platform-as-a-service (PaaS) (e.g., web services, streaming services, application development services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc. In some examples, the network architecture 100 can implement and/or host a serverless computing environment(s), as further described below.

The network architecture 100 described above illustrates a non-limiting example network environment and architecture provided herein for explanation purposes. It should be noted that other network environments and architectures can be implemented in other examples and are also contemplated herein. One of ordinary skill in the art will recognize in view of the disclosure that the technologies and approaches herein can apply to a variety of different network environments and architectures.

Figure 2:
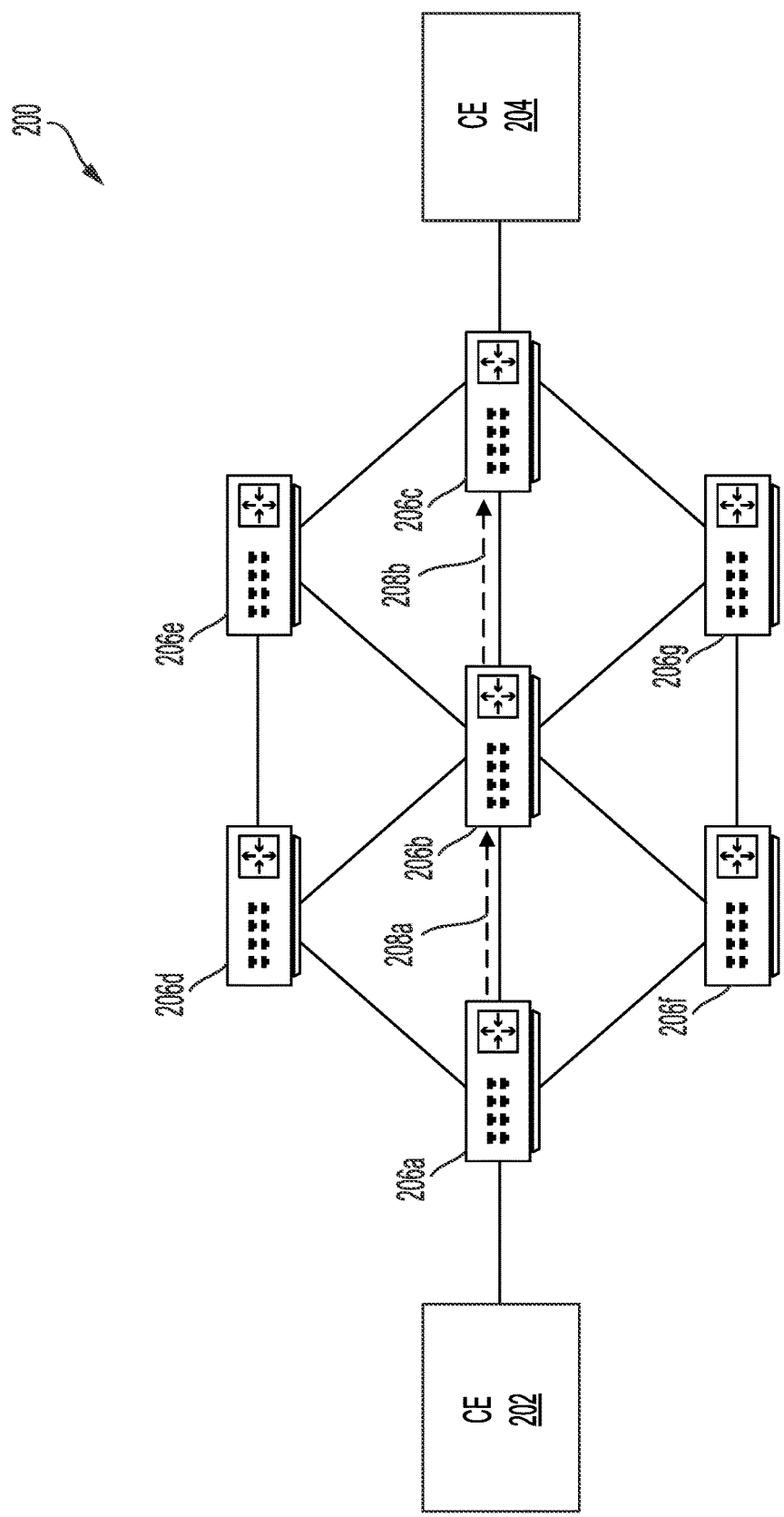
FIG. 2 is a block diagram illustrating another example of a network architecture for implementing Multiprotocol Label Switching (MPLS), in accordance with some examples.

FIG. 2 is a block diagram illustrating an example network 200. In some examples, network 200 can include a plurality of routers (e.g., routers 206a-206g; collectively, routers 206) for carrying data between customer edge (CE) device 202 and CE device 204. In some aspects, routers 206 may implement Multiprotocol Label Switching (MPLS). For example, routers 206 may route data packets in network 200 based on MPLS labels that are part of an MPLS header (e.g., MPLS label stack) that is associated with a data packet. In some instances, the MPLS labels may identify virtual links or paths between nodes (e.g., instead of endpoints).

In some aspects, a label edge router (LER) may correspond to a router that operates on the edge of an MPLS network (e.g., router 206a and router 206c). In some cases, a LER may function as an ingress and/or an egress point for an MPLS network. In some examples, a LER (e.g., router 206a and/or router 206c) may encapsulate a packet inside an MPLS Label Switched Path (LSP) that may correspond to a unidirectional tunnel between a pair of routers in an MPLS network. For example, the LSP may correspond to tunnel 208 that may include tunnel 208a (e.g., from router 206a to router 206b) and tunnel 208b (e.g., from router 206b to router 206c).

In some examples, upon receiving an unlabeled packet, router 206a may determine the forwarding equivalence class (FEC) for the packet and insert one or more labels in the packet's newly created MPLS header (also referred to herein as an MPLS label stack). For example, router 206a (e.g., ingress LER) can receive a packet from CE 202 and use routing information to determine appropriate MPLS labels to be affixed to the packet, label the packet, and forward the labeled packet into the MPLS domain. In some cases, an MPLS header can be added between the network layer header (e.g., the layer 3 header) and the link layer header (e.g., the layer 2 header) of the Open Systems Interconnection (OSI) model. In some aspects, MPLS can be used to carry traffic that can include Internet Protocol (IP) packets, Asynchronous Transfer Mode (ATM), Synchronous Optical Network (SONET), Ethernet frames, etc.

In some embodiments, a label switch router (LSR) may correspond to an intermediate network router (e.g., router 206*b*, router 206*d*, router 206*e*, router 206*f*, and/or router 206*g*). In some aspects, a LSR may receive a labeled packet and examine the label that is at the top of the MPLS label stack. In some examples, the LSR may perform a swap, a push, or pop operation based on the content of the label. For instance, a swap operation may include replacing or swapping the label with a new label and forwarding the data packet along the path associated with the new label. In another example, a push operation may include adding a new label on top f the existing label (e.g., encapsulating the packet in another layer of MPLS). In another example, a pop operation may include removing the label from the packet, which may reveal an inner label. In some cases, the process of removing (e.g., popping) a label may be referred to as decapsulation and it may be performed by an egress router (e.g., router 206*c*). In some configurations, penultimate hop popping may be performed, in which case an LSR that is connected to the LER (e.g., router 206*b*) may remove the MPLS label off the packet. In some examples, router 206*c* (e.g., egress LER) can forward the resulting IP packet using normal IP forwarding rules to CE 204.

Figure 3:
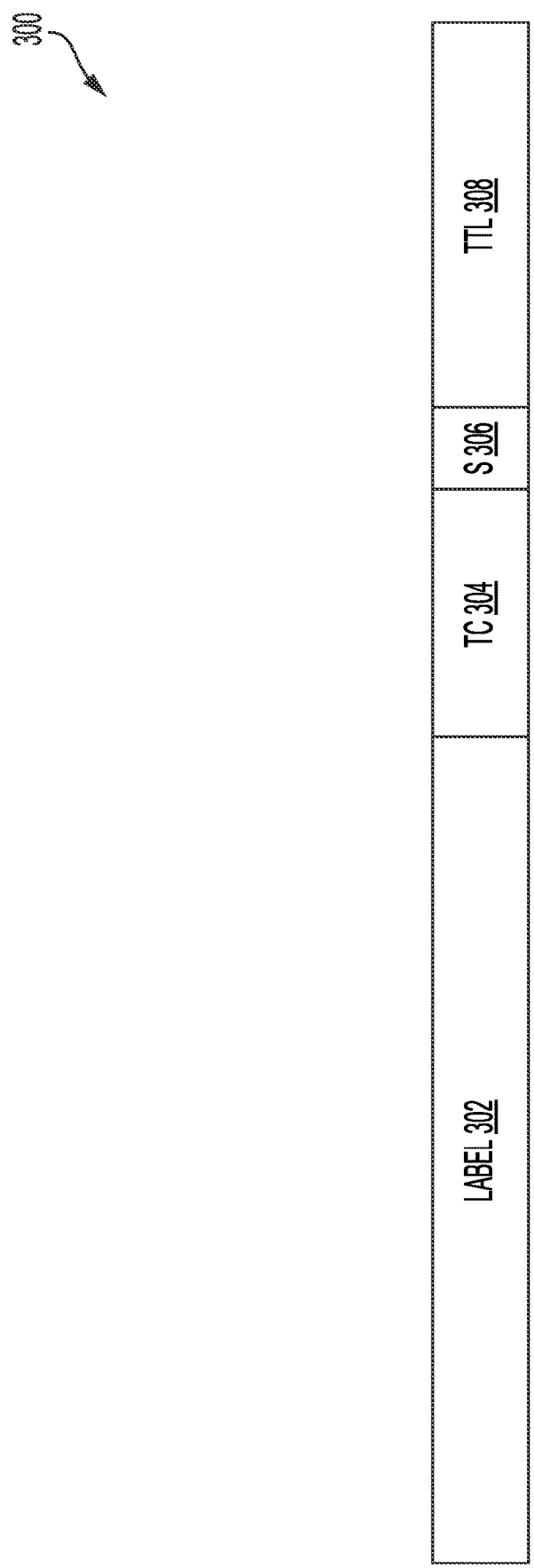
FIG. 3 illustrates the format of an MPLS label stack entry, in accordance with some examples.

FIG. 3 illustrates a format of a Multiprotocol Label Switching (MPLS) stack entry 300. In some aspects, MPLS stack entry 300 may include a label field 302, a traffic class (TC) field 304, a bottom-of-stack (S) field 306, and a time-to-live (TTL) field 308. In some cases, label field 302 may include a 20 bit label value, TC field 304 may include a 3 bit TC value, S field 306 may include a 1 bit bottom-of-stack indication, and TTL field 308 may include an 8 bit TTL value.

In some aspects, label field 302 may include a forwarding label, a source label, a functional label, a user-configured label, and/or any other type of label. For example, a forwarding label included in label field 302 can be used to forward the MPLS traffic in the data plane towards the destination on a hop-by-hop basis. In another example, a source label included in label field 302 can be used to identify the LSP source end-point. In another example, a functional label included in label field 302 can be used to identify an action to be performed by an LSR. In some aspects, the functional label may correspond to a special purpose label (SPL), an extended special purpose label (eSPL), a network programming label (NPL), and/or any other type of suitable label.

In some examples, a SPL may include a reserved label as allocated by the Internet Assigned Numbers Authority (IANA). For instance, the SPL included in label field 302 may correspond to a router Operation and Maintenance (OAM) alert label (e.g., value 14) to pass the data packet to the control/management plane for further action. In another example, the SPL included in label field 302 may correspond to an entropy label indicator (ELI) label (e.g., value 7) that may indicate the presence of an entropy label (e.g., in a subsequent label stack entry) that can be used to implement load balancing functions.

In some aspects, TC field 304 can be used to specify a Quality of Service (QOS) metric. For instance, TC field 304 may be used to specify QoS priority and/or to provide an Explicit Congestion Notification. In some cases, S field 306 can correspond to a bottom-of-stack flag that indicates where the MPLS stack entry is in an MPLS header. For example, when S=1 (e.g., S flag is set) the MPLS stack entry is at the bottom position in an MPLS header (e.g., innermost position closest to the payload) and when S=0 (e.g., S flag is not set) the MPLS stack entry is not at the bottom position in an MPLS header (e.g., at least one additional label stack entry follows). In some examples, TTL field 308 can be used to specify a time-to-live for the packet (e.g., number of hops that packet may exist prior to being discarded). In some cases, TTL field 308 can prevent infinite forwarding loops of MPLS packets.

Figure 4:
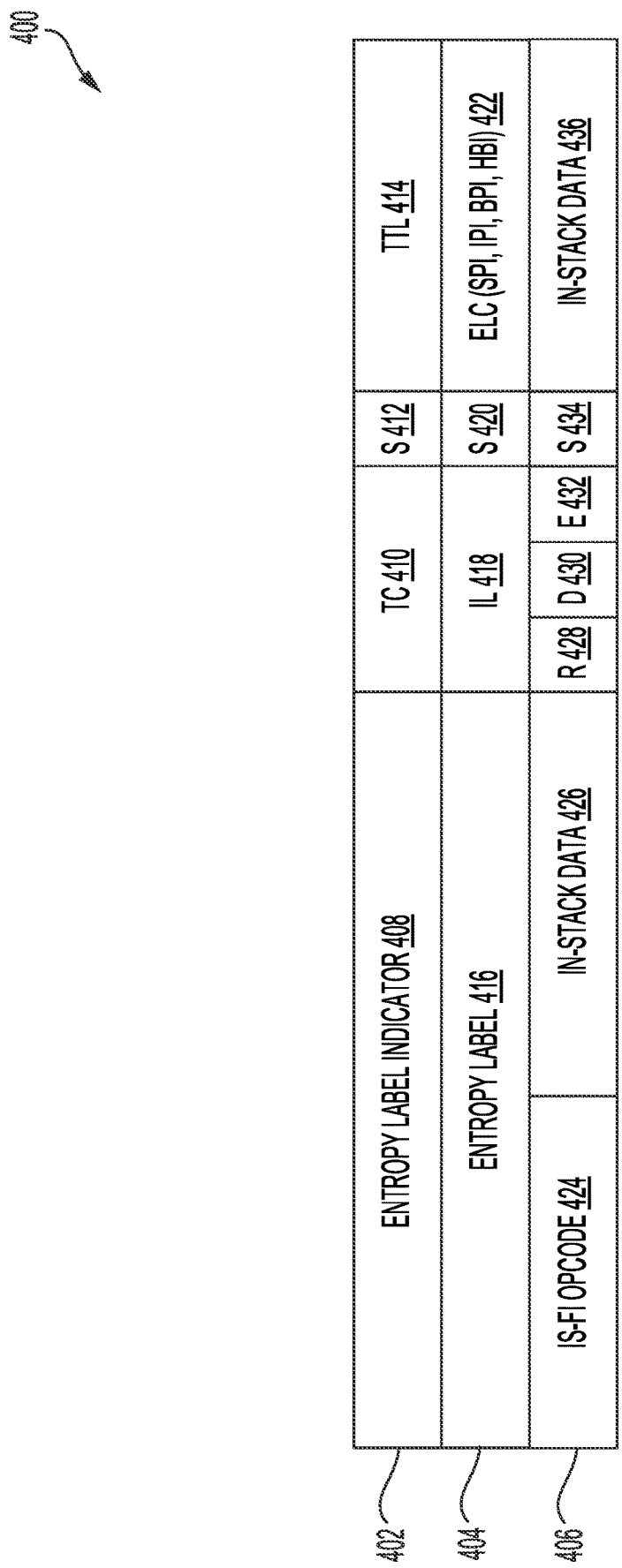
FIG. 4 illustrates an example MPLS label stack that includes an in-stack MPLS extension header, in accordance with some examples.

FIG. 4 illustrates an example of a Multiprotocol Label Switching (MPLS) label stack 400. In some aspects, MPLS label stack 400 may include one or more label stack entries (e.g., label stack entry 402, label stack entry 404, and label stack entry 406). In some cases, label stack entry 402 may include entropy label indicator (ELI) 408 (e.g., special purpose label 7). In some examples, ELI 408 can provide an indication that an entropy label follows in the next stack entry (e.g., entropy label 416 in stack entry 404). In some embodiments, label stack entry 402 may include traffic class (TC) 410, S 412 (e.g., bottom of stack indicator), and time-to-live (TTL) 414. In some aspects, entropy label indicator 408, TC 410, S 412, and TTL 414 may correspond to label field 302, TC 304, S 306 and TTL 308, respectively.

In some cases, label stack entry 404 may include entropy label 416 that can be used to implement load balancing functions. In some embodiments, label stack entry 404 may include an in-stack extension header length (IL) 418. For example, IL 418 may be used to indicate the length of an in-stack MPLS extension header (e.g., excluding ELI and EL labels). In some cases, IL 418 may indicate the length of the in-stack extension header as a number of 32-bit labels. In some aspects, the maximum value of IL 418 may correspond to 7 labels (e.g., based on 3 bit value for IL 418). In some embodiments, an MPLS extension header that exceeds 7 labels may be implemented by including the additional labels in the bottom-of-stack header and/or by using another ELI/EL pair (e.g., duplicating label stack entries corresponding to label stack entry 402 and label stack entry 404). In some cases, a router (e.g., routers 200) may read the length from IL 418 based on a status of a bit in entropy label control 422, as discussed further below.

In some configurations, label stack entry 404 may include S 420 (e.g., bottom of stack indicator). In some aspects, S 420 can have a value of 0 to indicate that label stack entry is not the final entry before the bottom-of-stack. In some embodiments, label stack entry 404 can include entropy label control (ELC) 422. In some cases, ELC 422 can include up to 8 bits that can be used as flags to provide one or more indications. For example, ELC 422 may include a slice identifier presence indicator (SPI) or a network resource partition identifier that can be used to indicate the presence of a slice identifier (slice ID) or a network resource partition ID) in the entropy label 416 (e.g., the slice ID or network resource partition ID may correspond to a portion of the bits within entropy label 416).

In some cases, ELC 422 may include an in-stack extension header presence indicator (IPI). In some aspects, the value of the IPI (e.g., set to 1) can be used to indicate the presence of an in-stack MPLS extension header after label entry 404. In some cases, a router may read the value of IL 418 when IPI indicates the presence of an in-stack MPLS extension header. In some embodiments, ELC 422 may include a bottom-of-stack extension header presence indicator (BPI). In some aspects, the value of the BPI (e.g., set to 1) can be used to indicate the presence of an MPLS extension header after the bottom-of-stack. In some instances, ELC 422 can include a hop-by-hop bottom-of-stack extension header indicator (HBI). In some cases, the value of the HBI (e.g., set to 1) can be used to indicate that the MPLS extension header after the bottom-of-stack requires hop-by-hop processing. In some examples, the IPI, the BPI and/or the HBI flags may be included in TC field 410.

In some examples, MPLS label stack 400 may include label stack entry 406 corresponding to an in-stack MPLS extension header (e.g., IPI is set to 1). In some aspects, label stack entry 406 may include an in-stack forwarding instruction (IS-FI) opcode 424. In one illustrative example, IS-FI opcode 424 may correspond to a forwarding instruction opcode (e.g., IANA allocated as value of 1) to carry the forwarding instruction flags (FIF) as part of in-stack data 426 and/or in-stack data 436. In another example, IS-FI opcode 424 may correspond to a bottom-of-stack offset opcode (e.g., IANA allocated as value of 2) to indicate an offset for the start of the bottom-of-stack after the MPLS label bottom-of-stack. In some cases, the offset may be included as part of in-stack data 426 and/or in-stack data 436. In some examples, the offset may be indicated as a number of bytes. In some aspects, the bottom-of-stack offset opcode can be used to include a generic control word and/or a generic associated channel (G-Ach) after bottom-of-stack (e.g., after stack entry with S=1 and before the BOS extension header). In some embodiments, IS-FI opcode 424 may have a value from 3-254. In some examples, the value and/or corresponding functionality of IS-FI opcode 424 may be assigned or allocated by the IANA. In some cases, IS-FI opcode 424 may have a value of 255 that may be used to extend the opcode range (e.g., beyond 255). In some cases, the IS-FI opcode value may be user-configured.

In some aspects, stack entry 406 may include a reserved bit R 428. For instance, R 428 may be set to a value of 0 and may be ignored by a receiving router. In some examples, R 428 may be set to a value of 1 to indicate that this is the end of the entire MPLS in-stack extension header that is part of the MEI label in 408. In some examples, R bit may be set to 0 to indicate that there is additional in-stack extension header present which is part of the MEI label in 408. In some examples, stack entry 406 may include a data stacking bit D 430 that can be used to encode more than 20 bits of data for IS-FI opcode 424. For example, D 430 may be set to a value of 1 to indicate the end of the data for IS-FI opcode 424. In another example, D 430 may be set to a value of 0 to indicate that additional data associated with IS-FI opcode 424 is included in a subsequent stack entry. In some embodiments, stack entry 406 may include an end-to-end processing bit E 432 that can be used to indicate end-to-end processing. For example, E 432 may be set to a value of 1 to indicate that the MPLS extension header and associated in-stack opcode and in-stack data requires end-to-end processing. In another example, E 432 may be set to a value of 0 to indicate that the MPLS extension header and the associated in-stack opcode and in-stack data requires hop-by-hop processing.

It is noted that the position and size of the different fields within MPLS label stack 400 are not limited to the illustration in FIG. 4. For example, in-stack data 426 and in-stack data 436 may be collocated at the beginning of stack entry 406 (e.g., field corresponding to label 302) and IS-FI opcode 424 may be located in the field designated for in-stack data 436 (e.g., field corresponding to TTL 308). In some cases, a flag in ELC 422 or in TTL 414 (e.g., in-stack data format indicator (IFI) flag) may be used to indicate an in-stack data encoding format. For instance, the IFI flag may indicate that the in-stack data is encoded using an alternate encoding format with the IS-FI Opcode carried in the 8-bit TTL field (e.g., field 436) and in-stack data carried in 20-bit label field (e.g., fields 424 and 426). In some cases, a bit in the TC field (e.g., TC 410) of the entropy label may be defined to indicate the encoding format (e.g., IS-FI opcode encoding and/or in-stack data encoding).

Figure 5:
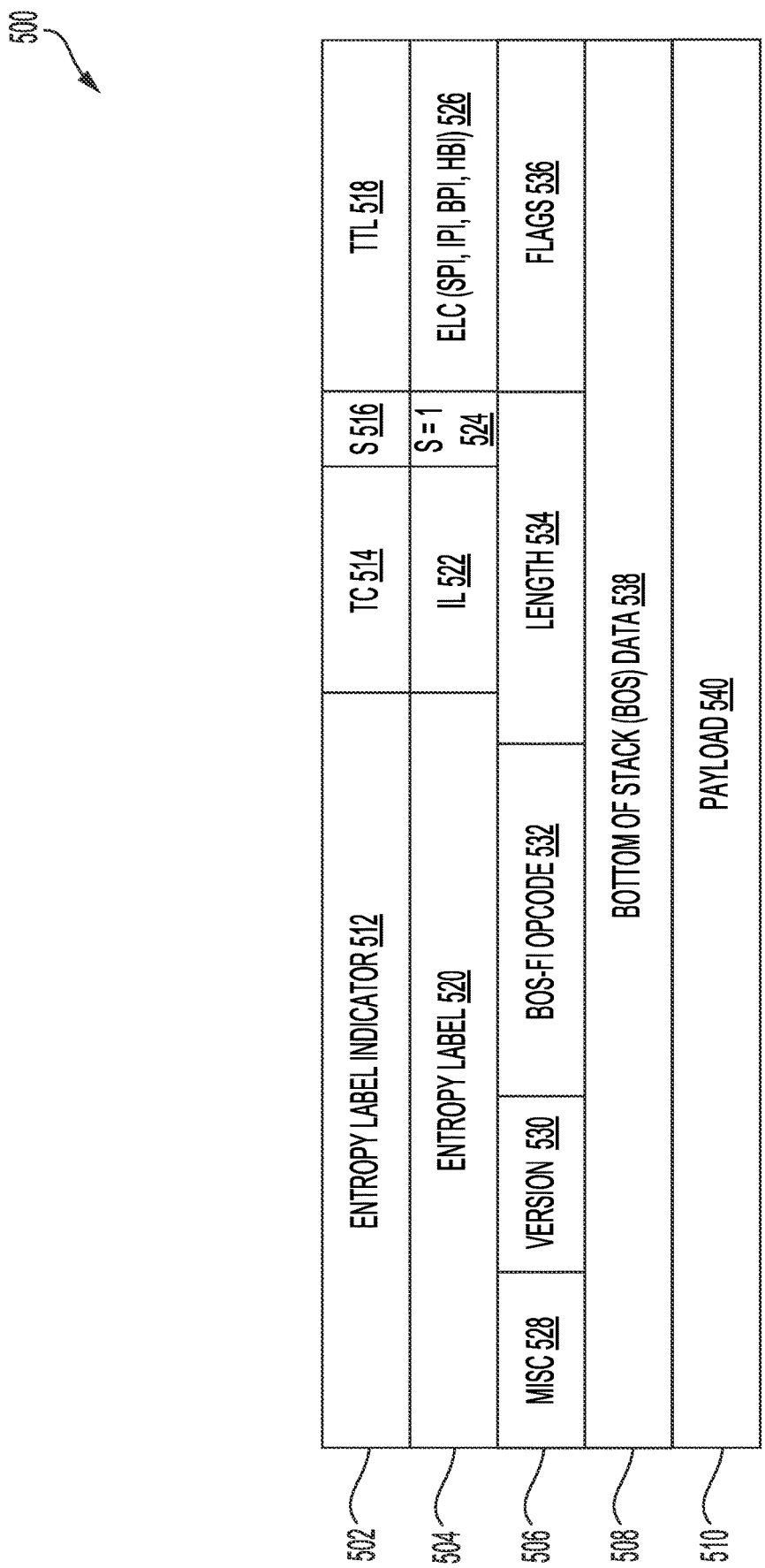
FIG. 5 illustrates an example MPLS label stack that includes a bottom-of-stack MPLS extension header, in accordance with some examples.

FIG. 5 illustrates an example of a Multiprotocol Label Switching (MPLS) label stack 500. In some aspects, MPLS label stack 500 may include one or more label stack entries (e.g., label stack entry 502, label stack entry 504, label stack entry 506, label stack entry 508, and label stack entry 510). In some cases, label stack entry 502 may include entropy label indicator (ELI) 512 (e.g., special purpose label 7). As noted above, ELI 512 can provide an indication that an entropy label follows in the next stack entry (e.g., entropy label 520 in stack entry 504). In some embodiments, label stack entry 502 may include traffic class (TC) 514, S 516 (e.g., bottom of stack indicator), and time-to-live (TTL) 518. In some aspects, entropy label indicator 512, TC 514, S 516, and TTL 518 may correspond to label field 302, TC 304, S 306 and TTL 308, respectively.

In some cases, label stack entry 504 may include entropy label 520 that can be used to implement load balancing functions. In some embodiments, label stack entry 504 may include an in-stack extension header length (IL) 522 that may be used to indicate the length of an in-stack MPLS extension header.

In some configurations, label stack entry 504 may include S 524 (e.g., bottom of stack indicator). In some aspects, S 524 can have a value of 1 to indicate that label stack entry is the final entry before the bottom-of-stack. In some embodiments, label stack entry 504 can include entropy label control (ELC) 526. In some cases, ELC 526 can include SPI, IPI, BPI, and/or HBI as noted above with respect to ELC 422. In some aspects, the value of BPI (e.g., bottom-of-stack extension header presence indicator) may be set to 1 to indicate the presence of a bottom-of-stack MPLS extension header. In some cases, the value of HBI (e.g., hop-by-hop bottom-of-stack extension header indicator) may be set to 1 to indicate that the MPLS extension header after the bottom-of-stack requires hop-by-hop processing.

In some examples, MPLS label stack 500 may include label stack entry 506 corresponding to a bottom-of-stack MPLS extension header (e.g., BPI is set to 1). In some aspects, label stack entry 506 may include a miscellaneous field 528 that may be set to a binary value (e.g., a value of "0010" or "1000") to avoid aliasing with an IPV4 (e.g., "0100") and/or an IPV6 (e.g., "0110") header. In some cases, label stack entry 506 may include a version 530 to indicate a version of the bottom-of-stack MPLS extension header. For instance, an initial value of version 530 can be 0. In some embodiments, label stack entry 506 may include a bottom-of-stack forwarding instruction (BOS-FI) opcode 532. In some examples, BOS-FI opcode 532 may have a value from 1-254. In some cases, the value and/or corresponding functionality of BOS-FI opcode 532 may be assigned or allocated by the IANA. In some cases, IS-FI opcode 424 may have a value of 255 that may be used to extend the opcode range (e.g., beyond 255).

In some cases, label stack entry 506 may include length 534 to indicate the length of the encoded data that is associated with BOS-FI opcode 532. In some instances, length 534 may indicate the length of the data in units of 4 bytes (i.e., 32 bits) that may exclude the current header. For example, a length value of 1 may indicate that bottom-of-stack data 538 includes 32 bits. In some configurations, label stack entry 506 may include flags 536. In some cases, flags 536 may include a next-header (NH) presence bit that can be used to indicate the presence of next extension header. In some examples, flags 536 can include a hop-by-hop (H) bit that can be used to indicate that hop-by-hop processing is required for bottom-of-stack data 538. In some cases, flags 536 may include the protocol type of the next-header (e.g., UDP header) following the extension header. In some examples (not illustrated), the header may include the length of the offset (in 4-byte words) to reach the start of the payload data (e.g., payload 540).

In some cases, label stack entry 508 can include bottom-of-stack data 538. As noted above, bottom-of-stack data 538 can include data associated with BOS-FI opcode 532. In some examples, bottom-of-stack data 538 can include 32 bits of data based on a length 534 value of 1. In another example, additional label stack entries (not illustrated) may be added to MPLS label stack 500 to include further data. In some aspects, the payload 540 of the data packet can be included in the original layer 3 packet 510. In some examples, a packet may not include payload 540 (e.g., probe or test packets).

Figure 6:
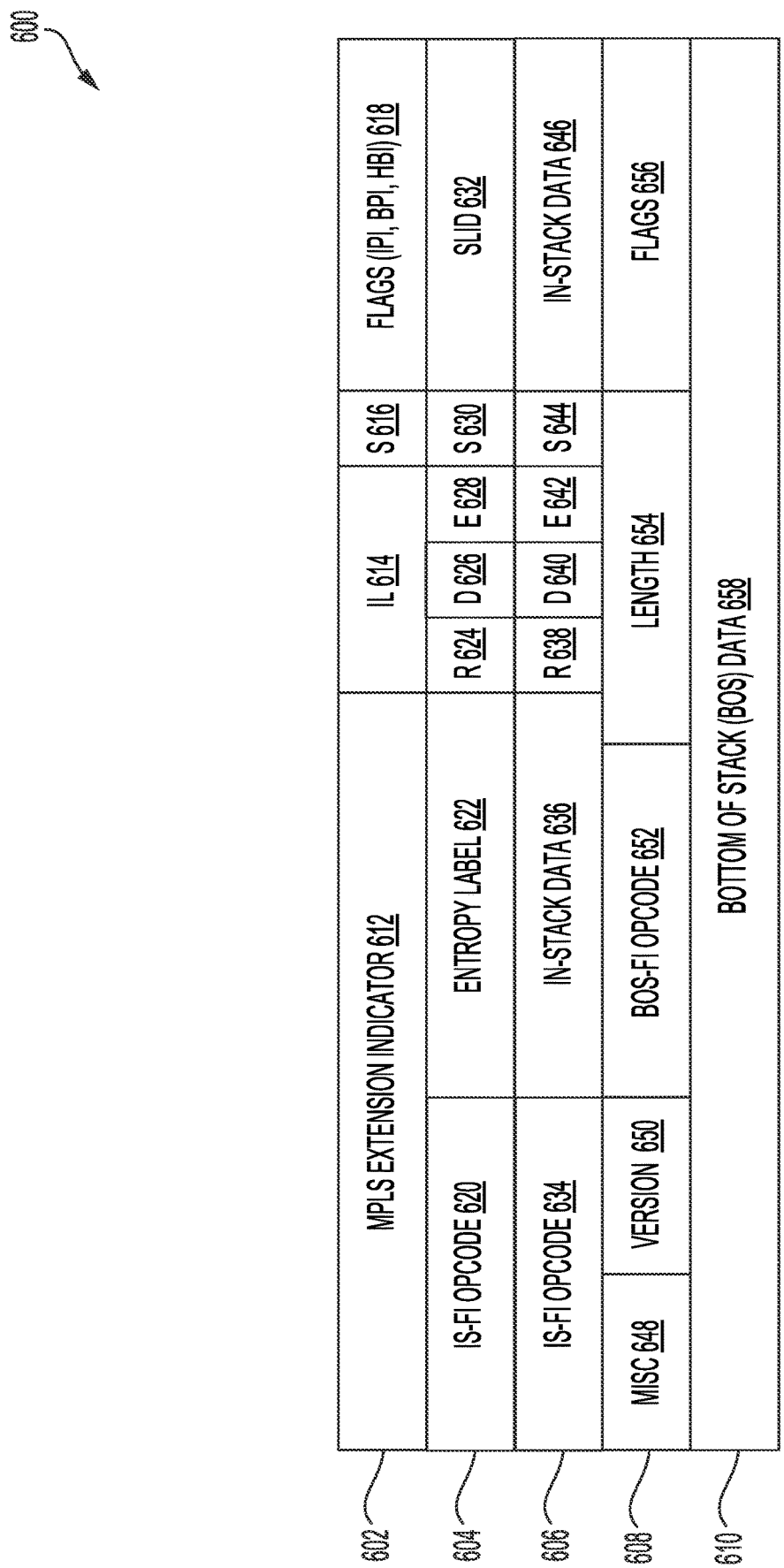
FIG. 6 illustrates an example MPLS label stack that includes in-stack and bottom-of-stack MPLS extension headers, in accordance with some examples.

FIG. 6 illustrates an example of a Multiprotocol Label Switching (MPLS) label stack 600. In some aspects, MPLS label stack 600 may include one or more label stack entries (e.g., label stack entry 602, label stack entry 604, label stack entry 606, label stack entry 608, and label stack entry 610). In some cases, label stack entry 602 may include an MPLS extension indicator (MEI) 612. In some cases, MEI 612 can include a special purpose label (SPL), an extended special purpose label (eSPL), a network programming label (NPL), a label configured by a user, and/or any other type of label. In some embodiments, label stack entry 602 may include an in-stack extension header length (IL) 614. For example, IL 614 may be used to indicate the length of an in-stack MPLS extension header. In some aspects, label stack entry 602 can include S 616 (e.g., bottom of stack indicator). In some cases, label stack entry 602 can include flags 618. In some configurations, flags 618 can correspond to one or more of the flags in ELC 422. For example, flags 618 can include an in-stack extension header presence indicator (IPI), a bottom-of-stack extension header presence indicator (BPI), a hop-by-hop bottom-of-stack extension header indicator (HBI), and/or any other type of flags (e.g., in-stack data format indicator (IFI) flag, in-stack extension header encoding format, etc.).

In some aspects, label stack entry 604 and label stack entry 606 can correspond to in-stack extension headers (e.g., IPI flag is set and IL=2). In some cases, label stack entry 604 may include an in-stack forwarding instruction (IS-FI) opcode 620 (e.g., opcode value=3) that is used to indicate encoding of entropy label 622 and network slice ID 632 or a network resource partition (NRP) ID. In some examples, label stack entry 604 may include one or more additional fields such as reserved R bit 624, data stacking bit D 626, and end-to-end processing bit E 628. In some aspects, R 624, D 626, and E 628 can correspond to R 428, D 430, and E 432, respectively. In some cases, D 626 may be set to a value of 0 to indicate data stacking associated with IS-FI opcode 620. In some examples, label stack entry 604 may include S 630 (e.g., set to value of 0) to indicate that label stack entry 604 is not at the bottom-of-stack.

In some cases, label stack entry 606 may include an in-stack forwarding instruction (IS-FI) opcode 634 (e.g., opcode value=4) that can be used to indicate encoding of additional in-stack data (e.g., in-stack data 636 and/or in-stack data 646) that is associated with IS-FI opcode 634. In some embodiments, label stack 606 may include additional fields such as reserved R bit 638, data stacking bit D 640, and end-to-end processing bit E 642. In some examples, D 640 may be set to a value of 1 to indicate the end of the data for IS-FI opcode 634. In some examples, E 642 may be set to a value of 0 to indicate the extension header requires hop-by-hop processing. In some examples, R bit 638 may be set to a value of 1 to indicate the extension header continues (and this is not the end). In some examples, label stack entry 606 may include S 644 (e.g., set to value of 1) to indicate that label stack entry 606 is at the bottom-of-stack.

In some aspects, label stack entry 608 may correspond to a bottom-of-stack extension header (e.g., BPI flag is set in flags 618). In some cases, label stack entry 608 may include a miscellaneous field 648. In some cases, MISC 648 can be set to a binary value that is selected to avoid conflict or aliasing (e.g., a binary value of "0010" or "1000" as an example can be used to avoid aliasing with an IPV4 ("0100") and/or an IPV6 ("0110") header). In some cases, label stack entry 608 may include a version 650 to indicate a version of the bottom-of-stack MPLS extension header. In some embodiments, label stack entry 608 may include a bottom-of-stack forwarding instruction (BOS-FI) opcode 652. In some cases, label stack entry 608 may include length 654 to indicate the length of the encoded data that is associated with BOS-FI opcode 652. In some configurations, label stack entry 608 may include flags 656. In some cases, flags 656 may include a next-header (NH) presence bit that can be used to indicate the presence of next extension header. In some examples, flags 656 can include a hop-by-hop (H) bit that can be used to indicate that hop-by-hop processing is required for bottom-of-stack data 658. In some examples, flags 656 can include the type of the protocol of the next header (e.g., UDP header). In some examples (not shown), the header may include the length of the offset (in 4-byte words) to reach the start of the payload data.

In some cases, label stack entry 610 can include bottom-of-stack data 658. As noted above, bottom-of-stack data 658 can include data associated with BOS-FI opcode 652. In some examples, bottom-of-stack data 658 can include 32 bits of data based on a length 654 value of 1.

FIG. 7 illustrates an example of a Multiprotocol Label Switching (MPLS) label stack 700. In some aspects, MPLS label stack 700 may include one or more label stack entries (e.g., label stack entry 702-726). In some cases, label stack entry 702 may include an entropy label indicator (ELI) (e.g., a special purpose label) that can provide an indication that an entropy label follows in the next stack entry (e.g., entropy label in stack entry 704). In some embodiments, label stack entry 702 may include a traffic class (TC) field, a bottom of stack indicator S, and time-to-live (TTL). In some aspects, bottom-of-stack indicator S may have a value of 0 indicating that label stack entry 702 is not the last label in the stack.

In some embodiments, label stack entry 704 may include an entropy label (e.g., corresponding to ELI in stack entry 702). In some configurations, label stack entry 704 may also include an in-stack extension header length that is equal to 4 (e.g., label stack entries 706-712). In some aspects, label stack entry 704 may include an entropy label control (ELC) field with BPI and HBI each set to a value of 1 indicating presence of an in-stack extension header and a bottom-of-stack extension header.

In some cases, label stack entry 706 may correspond to a first in-stack extension header. For example, label stack entry 706 may include an in-stack forwarding instruction (IS-FI) opcode indicating presence of forwarding instruction flags. In some aspects, label stack entry 706 may include one or more data fields that include the forwarding instruction (FI) flags. In some cases, label stack 706 may include a data stacking bit D that indicates data stacking associated with the current label (e.g., D=0). In some embodiments, label stack entry 708 may include additional data (e.g., additional forwarding instruction flags) corresponding to the IS-FI opcode from label stack entry 706. In some cases, the data stacking bit D in label stack entry 708 can be set to a value (e.g., D=1) indicating no further data stacking. In some aspects, while encoding an additional in-stack data, the most significant bit of the label field 708 may be set to "1" to prevent the label value from aliasing with a reserved SPL value (e.g., to avoid undesired forwarding behavior in the case of enabling on legacy devices). In some cases, the most significant bit may be set to "1" in the cases when in-stack data size is more than 20 bits.

In some aspects, label stack entry 710 may include an in-stack forwarding instruction (IS-FI) opcode indicating an offset for the start of bottom-of-stack data after the MPLS label bottom-of-stack (e.g., S=1). In some cases, label stack entry 712 may include an IS-FI opcode indicating further encoding of data. In some aspects, label stack entry 712 may include an indication that label stack entry 712 is the last label in the stack (e.g., S=1).

In some cases, label stack entry 714 may include a control channel command (e.g., a generic control word (e.g., that may start with a binary value "0000") and/or a generic associated channel (G-ACh) (e.g., that may start with a binary value "0001"). In some cases, label stack entry 714 may be inserted based on IS-FI opcode included in label stack entry 710 indicating an offset between the last in-stack entry (e.g., label stack entry 712 where S=1) and the first bottom-of-stack entry (e.g., label stack entry 716). The control channel may be included before the bottom-of-stack header or may be included after the bottom-of-stack header and before the start of the payload.

In some examples, label stack entry 716 may correspond to a bottom-of-stack extension header that includes a bottom-of-stack forwarding instruction (BOS-FI) opcode (e.g., value=1). In some cases, label stack entry 716 may include a length field indicating that data associated with the BOS-FI opcode 1 has a length of 32 bits (e.g., a doubleword). In some instances, label stack entry 716 may include a flag requiring hop-by-hop processing. In some cases, label stack entry 718 can include bottom-of-stack data corresponding to BOS-FI opcode from label stack entry 716. In some cases, the flags 716 may include the protocol type of the next-header (e.g., UDP header) following the extension header.

In some aspects, label stack entry 720 may correspond to another bottom-of-stack extension header that includes a BOS-FI opcode (e.g., value=2). In some cases, label stack entry 716 may include a length field indicating that data associated with the BOS-FI opcode 2 has a length of 64 bits (e.g., two doublewords). In some instances, label stack entry 720 may include a flag indicating that hop-by-hop processing is not required for the BOS-FI opcode within label stack entry 720. In some cases, label stack entry 722 and label stack entry 724 can include bottom-of-stack data corresponding to BOS-FI opcode from label stack entry 720 (e.g., length of data=2). In some aspects, the payload 726 of the data packet can follow the last stack entry in the bottom-of-stack.

Figure 8:
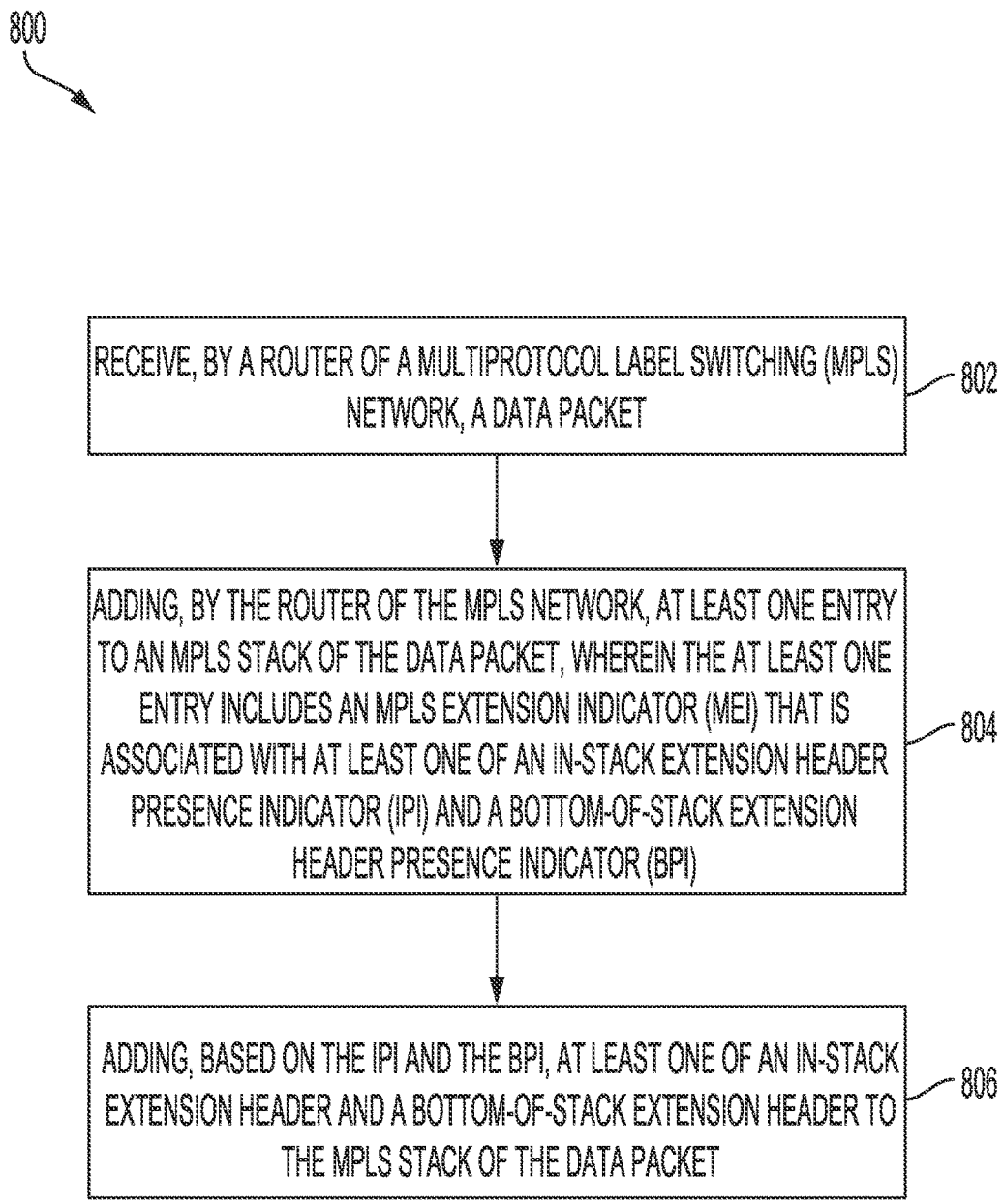
FIG. 8 is a flowchart illustrating an example method for implementing MPLS data plane header extensions, in accordance with some examples.

FIG. 8 is a flow diagram illustrating an example of a process 800 for implementing Multiprotocol Label Switching (MPLS) header extensions. At block 802, the process includes receiving, by a router of a multiprotocol label switching (MPLS) network, a data packet. For example, router 206a may receive a data packet from CE device 202.

At block 804, the process 800 includes adding, by the router of the MPLS network, at least one entry to an MPLS stack of the data packet, wherein the at least one entry includes an MPLS extension indicator (MEI) that is associated with at least one of an in-stack extension header presence indicator (IPI) and a bottom-of-stack extension header presence indicator (BPI). For example, router 206a may add an entry to the MPLS stack of the data packet that includes an MPLS extension indicator (MEI) that is associated with at least one of an in-stack extension header presence indicator (IPI) and a bottom-of-stack extension header presence indicator (BPI). In some examples, the entry to the MPLS stack may correspond to stack entry 602 that includes MPLS extension indicator (MEI) 612. In some examples, MEI 612 may be associated with an IPI and/or a BPI in flags 618. In some cases, the IPI and the BPI may be included in a time-to-live (TTL) field of the at least one entry to the MPLS stack. For example, IPI and/or BPI may be included in flags 618 which corresponds to a TTL field (e.g., TTL 308).

In some aspects, the MEI may correspond to at least one of a special purpose label (SPL), an extended special purpose label (eSPL), and network programming label (NPL). In some cases, the special purpose label may correspond to an entropy label indicator wherein the IPI and the BPI are included in an entropy label control (ELC) field. For example, the special purpose label may correspond to entropy label indicator 408 or entropy label indicator 512. In some cases, entropy label indicator 408 may be associated with an IPI and/or a BPI that is included in entropy label control field (ELC) 422. In some instances, entropy label indicator 512 may be associated with an IPI and/or a BPI that is included in ELC 526.

At block 806, the process 800 includes adding, based on the IPI and the BPI, at least one of an in-stack extension header and a bottom-of-stack extension header to the MPLS stack of the data packet. For instance, router 206a may add an in-stack extension header to the MPLS stack of the data packet when the IPI is set to a value that indicates presence of the in-stack extension header. In another example, router 206a may add an out-of-stack extension header to the MPLS stack of the data packet when the BPI is set to a value that indicates presence of the out-of-stack extension header.

In some aspects, the in-stack extension header can include an in-stack forwarding instruction and a data field. For instance, the in-stack extension header may correspond to stack entry 406 that may include in-stack forwarding instruction opcode 424, in-stack data 426, and/or in-stack data 236. In some cases, the in-stack forwarding instruction may indicate that the data field includes a plurality of forwarding instruction flags. For example, in-stack forwarding instruction opcode 424 may correspond to an opcode value (e.g., opcode value 1) that indicates presence of forwarding instruction flags within in-stack data 426 and/or in-stack data 436.

In some examples, the in-stack forwarding instruction may indicate that the data field includes a bottom-of-stack offset. For instance, in-stack forwarding instruction opcode 424 may correspond to an opcode value (e.g., opcode value 2) that indicates presence of a bottom-of-stack offset within in-stack data 426 and/or in-stack data 436. In some aspects, the offset indicates a number of bytes from for the start of the bottom-of-stack data after the MPLS label bottom-of-stack.

In some aspects, the bottom-of-stack extension header can include a first label stack entry and a second label stack entry, wherein the first label stack entry includes a bottom-of-stack forwarding instruction and the second label stack entry includes data associated with the bottom-of-stack forwarding instruction. For example, the bottom-of-stack label header may include stack entry 506 and stack entry 508. In some cases, stack entry 506 may include bottom-of-stack forwarding instruction opcode 532 that may be associated with bottom-of-stack data 538 within stack entry 508.

Figure 9:
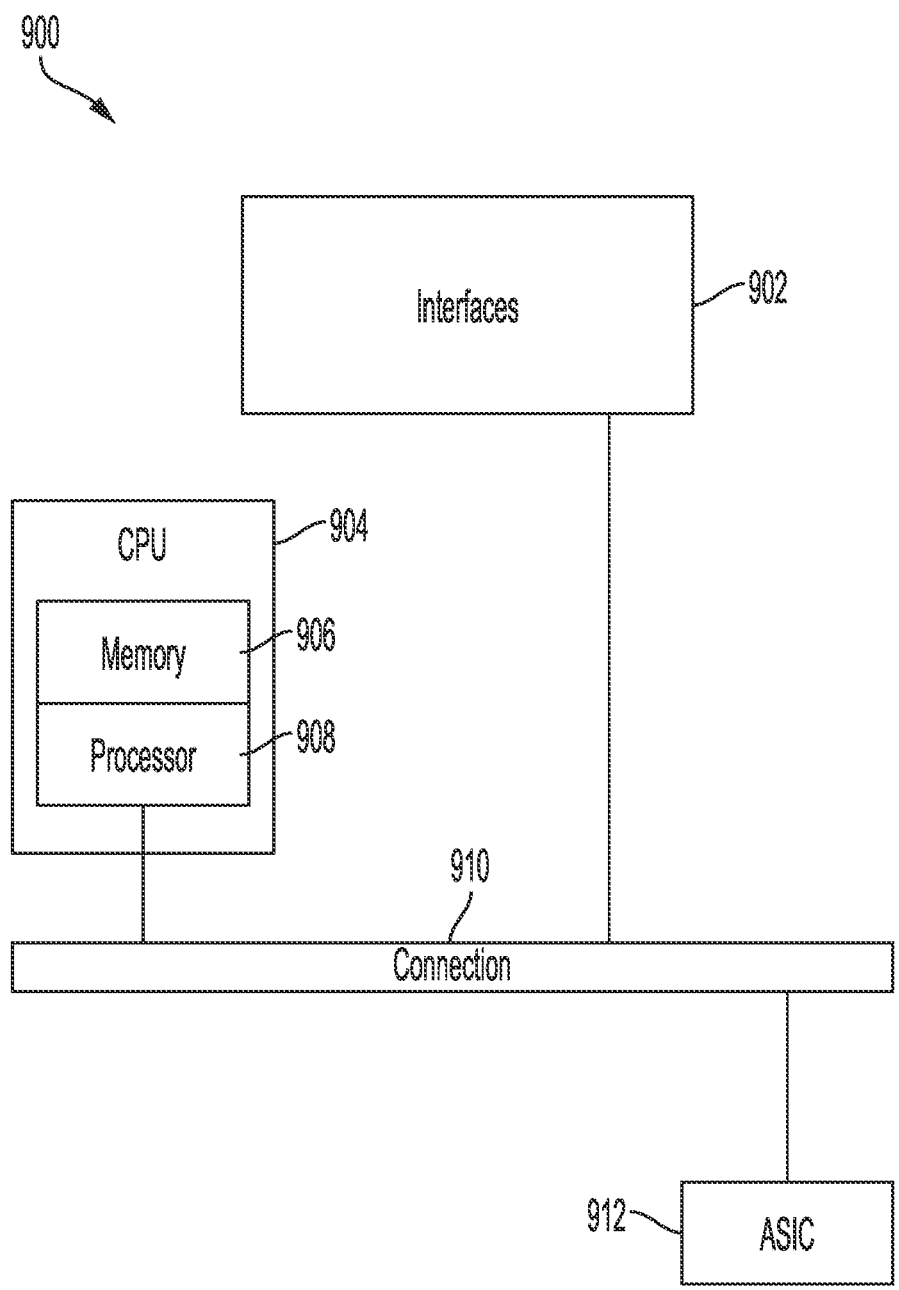
FIG. 9 illustrates an example network device, in accordance with some examples.
Figure 10:
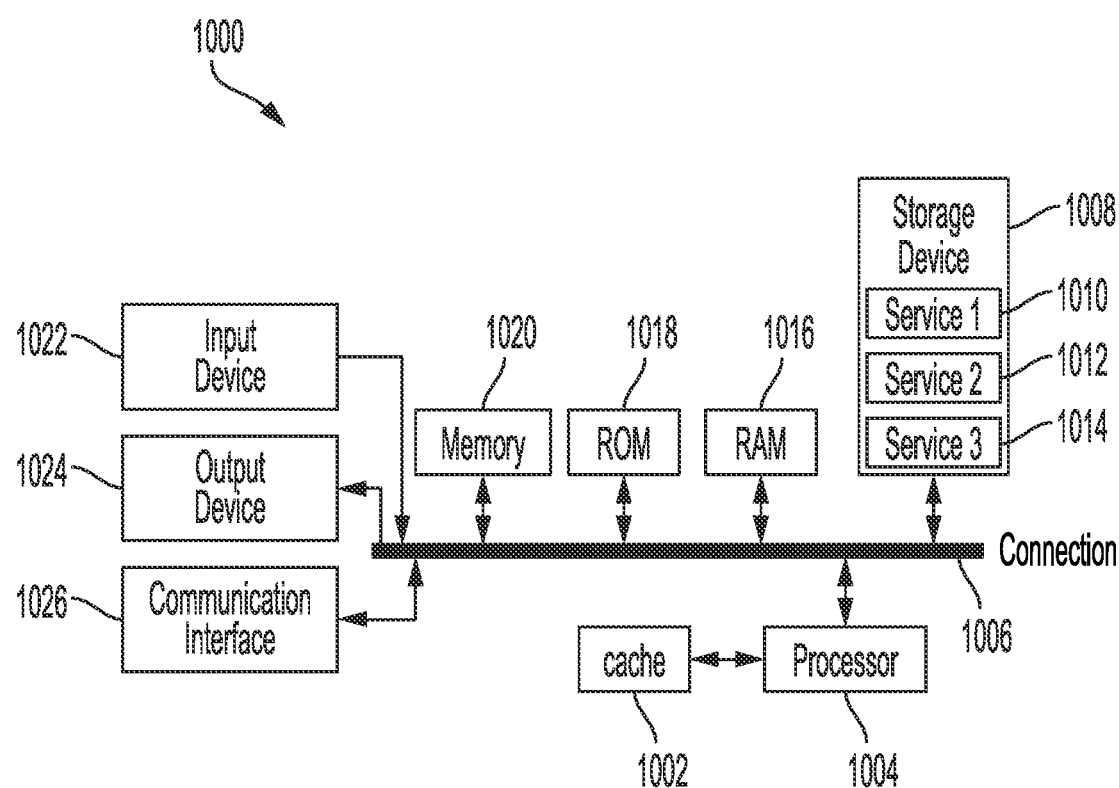
FIG. 10 illustrates an example computing device, in accordance with some examples.

The disclosure now turns to FIGS. 9 and 10, which illustrate example network devices and computing devices, such as switches, routers, nodes, servers, client devices, orchestrators, and so forth.

FIG. 9 illustrates an example network device 900 suitable for performing switching, routing, load balancing, and other networking operations. Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

FIG. 10 illustrates an example computing system architecture of a system 1000 which can be used to process FaaS operations and requests, deploying execution environments, loading code associated with FaaS functions, and perform any other computing operations described herein. In this example, the components of the system 1000 are in electrical communication with each other using a connection 1006, such as a bus. The system 1000 includes a processing unit (CPU or processor) 1004 and a connection 1006 that couples various system components including a memory 1020, such as read only memory (ROM) 1018 and random access memory (RAM) 1016, to the processor 1004.

The system 1000 can include a cache of high-speed memory connected directly with, in close proximity to, or integrated as part of the processor 1004. The system 1000 can copy data from the memory 1020 and/or the storage device 1008 to cache 1002 for quick access by the processor 1004. In this way, the cache can provide a performance boost that avoids processor 1004 delays while waiting for data. These and other modules can control or be configured to control the processor 1004 to perform various actions. Other memory 1020 may be available for use as well. The memory 1020 can include multiple different types of memory with different performance characteristics. The processor 1004 can include any general purpose processor and a hardware or software service, such as service 1 1010, service 2 1012, and service 3 1014 stored in storage device 1008, configured to control the processor 1004 as well as a special-purpose processor where software instructions are incorporated into the actual processor design. The processor 1004 may be a completely self-contained computing system, containing multiple cores or processors, a bus, memory controller, cache, etc. A multi-core processor may be symmetric or asymmetric.

To enable user interaction with the computing system 1000, an input device 1022 can represent any number of input mechanisms, such as a microphone for speech, a touch-sensitive screen for gesture or graphical input, keyboard, mouse, motion input, speech and so forth. An output device 1024 can also be one or more of a number of output mechanisms known to those of skill in the art. In some instances, multimodal systems can enable a user to provide multiple types of input to communicate with the computing system 1000. The communications interface 1026 can generally govern and manage the user input and system output. There is no restriction on operating on any particular hardware arrangement and therefore the basic features here may easily be substituted for improved hardware or firmware arrangements as they are developed.

Storage device 1008 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1016, read only memory (ROM) 1018, and hybrids thereof.

The storage device 1008 can include services 1010, 1012, 1014 for controlling the processor 1004. Other hardware or software modules are contemplated. The storage device 1008 can be connected to the connection 1006. In one aspect, a hardware module that performs a particular function can include the software component stored in a computer-readable medium in connection with the necessary hardware components, such as the processor 1004, connection 1006, output device 1024, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a router of a multiprotocol label switching (MPLS) network, a data packet;
adding, by the router of the MPLS network, at least one entry to an MPLS stack of the data packet, wherein the at least one entry includes an MPLS extension indicator (MEI) that is associated with at least one of an in-stack extension header presence indicator (IPI) and a bottom-of-stack extension header presence indicator (BPI); and
adding ancillary data within the MPLS stack of the data packet by adding to the MPLS stack of the data packet at least one of an in-stack extension header when the IPI is set to a value that indicates presence of the in-stack extension header, and a bottom of stack extension header when the IPI is set to a value that indicates presence of the bottom of stack extension header,
wherein the ancillary data is associated with a network action and includes data other than a label value, traffic class, bottom of stack, and time to live.

2. The method of claim 1, wherein the MEI corresponds to at least one of a special purpose label (SPL), an extended special purpose label (eSPL), and a network programming label (NPL).

3. The method of claim 2, wherein the special purpose label corresponds to an entropy label indicator (ELI), and wherein the IPI and the BPI are included in an entropy label control (ELC) field.

4. The method of claim 1, wherein the IPI and the BPI are included in a time-to-live (TTL) field of the at least one entry to the MPLS stack.

5. The method of claim 1, wherein the in-stack extension header includes an in-stack forwarding instruction and a data field.

6. The method of claim 1, wherein adding the ancillary data includes adding the in-stack extension header to the MPLS stack of the data packet that corresponds to label stack entries for network actions.

7. The method of claim 5, wherein the in-stack forwarding instruction indicates that the data field includes a bottom-of-stack offset.

8. The method of claim 1, wherein the bottom-of-stack extension header includes a first label stack entry and a second label stack entry, wherein the first label stack entry includes a bottom-of-stack forwarding instruction and the second label stack entry includes data associated with the bottom-of-stack forwarding instruction.

9. An apparatus comprising:
one or more processors; and
at least one computer-readable storage medium having stored thereon instructions which, when executed by the one or more processors, cause the one or more processors to:
receive, by a router of a multiprotocol label switching (MPLS) network, a data packet;

add, by the router of the MPLS network, at least one entry to an MPLS stack of the data packet, wherein the at least one entry includes an MPLS extension indicator (MEI) that is associated with at least one of an in-stack extension header presence indicator (IPI) and a bottom-of-stack extension header presence indicator (BPI); and add ancillary data within the MPLS stack of the data packet by adding to the MPLS stack of the data packet at least one of an in-stack extension header when the IPI is set to a value that indicates presence of the in-stack extension header, and a bottom of stack extension header when the IPI is set to a value that indicates presence of the bottom of stack extension header, wherein the ancillary data is associated with a network action and includes data other than a label value, traffic class, bottom of stack, and time to live.

10. The apparatus of claim 9, wherein the MEI corresponds to at least one of a special purpose label (SPL), an extended special purpose label (eSPL), and a network programming label (NPL).

11. The apparatus of claim 10, wherein the special purpose label corresponds to an entropy label indicator, and wherein the IPI and the BPI are included in an entropy label control (ELC) field.

12. The apparatus of claim 9, wherein the IPI and the BPI are included in a time-to-live (TTL) field of the at least one entry to the MPLS stack.

13. The apparatus of claim 9, wherein the in-stack extension header includes an in-stack forwarding instruction and a data field.

14. The apparatus of claim 9, wherein the instruction to add the ancillary data includes instructions to add the in-stack extension header to the MPLS stack of the data packet that corresponds to label stack entries for network actions.

15. The apparatus of claim 14, wherein the in-stack forwarding instruction indicates that the data field includes a bottom-of-stack offset.

16. The apparatus of claim 9, wherein the bottom-of-stack extension header includes a first label stack entry and a second label stack entry, wherein the first label stack entry includes a bottom-of-stack forwarding instruction and the second label stack entry includes data associated with the bottom-of-stack forwarding instruction.

17. A non-transitory computer-readable storage medium having stored thereon instructions which, when executed by one or more processors, cause the one or more processors to:

receive, by a router of a multiprotocol label switching (MPLS) network, a data packet;

add, by the router of the MPLS network, at least one entry to an MPLS stack of the data packet, wherein the at least one entry includes an MPLS extension indicator (MEI) that is associated with at least one of an in-stack extension header presence indicator (IPI) and a bottom-of-stack extension header presence indicator (BPI); and add ancillary data within the MPLS stack of the data packet by adding to the MPLS stack of the data packet at least one of an in-stack extension header when the IPI is set to a value that indicates presence of the in-stack extension header, and a bottom of stack extension header when the IPI is set to a value that indicates presence of the bottom of stack extension header, wherein the ancillary data is associated with a network action and includes data other than a label value, traffic class, bottom of stack, and time to live.

18. The non-transitory computer-readable storage medium of claim 17, wherein the MEI corresponds to at least one of a special purpose label (SPL), an extended special purpose label (eSPL), and a network programming label (NPL).

19. The non-transitory computer-readable storage medium of claim 18, wherein the special purpose label corresponds to an entropy label indicator, and wherein the IPI and the BPI are included in an entropy label control (ELC) field.

20. The non-transitory computer-readable storage medium of claim 17, wherein the instruction to add the ancillary data includes instructions to add the in-stack extension header to the MPLS stack of the data packet that corresponds to label stack entries for network actions.

* * * * *